(12) United States Patent
Ishikawa et al.

(10) Patent No.: US 12,516,277 B2
(45) Date of Patent: Jan. 6, 2026

(54) CULTURE DEVICE WITH A VIBRATION PREVENTION MECHANISM

(71) Applicant: PHC Holdings Corporation, Tokyo (JP)

(72) Inventors: Eisuke Ishikawa, Gunma (JP); Ryo Yonehara, Saitama (JP); Shota Tanabe, Gunma (JP); Tomoyuki Otake, Saitama (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 714 days.

(21) Appl. No.: 17/947,639

(22) Filed: Sep. 19, 2022

(65) Prior Publication Data

US 2023/0016812 A1 Jan. 19, 2023

Related U.S. Application Data

(63) Continuation of application No. PCT/JP2021/009451, filed on Mar. 10, 2021.

(30) Foreign Application Priority Data

Mar. 23, 2020 (JP) .................................. 2020-050848

(51) Int. Cl.
 *C12M 1/00* (2006.01)
 *C12M 1/09* (2006.01)
 *F16F 15/00* (2006.01)
 *F16F 15/02* (2006.01)

(52) U.S. Cl.
 CPC ............ *C12M 23/34* (2013.01); *C12M 23/52* (2013.01); *C12M 23/56* (2013.01); *F16F 15/002* (2013.01); *F16F 15/02* (2013.01); *F16F 2230/18* (2013.01)

(58) Field of Classification Search
 CPC ...... C12M 23/34; C12M 23/52; C12M 23/56; F16F 15/002; F16F 15/02; F16F 2230/18
 USPC ...................................................... 435/286.1
 See application file for complete search history.

(56) References Cited

U.S. PATENT DOCUMENTS

| 8,192,983 B2* | 6/2012 | Kiyota ................... C12M 41/14 435/286.2 |
| 2013/0089924 A1* | 4/2013 | Yamasaki ............... C12M 41/14 435/303.1 |
| 2016/0192607 A1* | 7/2016 | Kitagawa ................ A01G 31/06 47/62 N |

(Continued)

FOREIGN PATENT DOCUMENTS

| JP | 2006166747 A * | 6/2006 | ............ C12M 41/34 |
| JP | 2013-066436 A | 4/2013 | |

(Continued)

OTHER PUBLICATIONS

JP2006166747A Description Machine English Translation (Year: 2006).*

(Continued)

*Primary Examiner* — Michael L Hobbs
*Assistant Examiner* — Lenora A Abel
(74) *Attorney, Agent, or Firm* — Rimon P.C.

(57) ABSTRACT

A culture apparatus includes an inner box for housing a culture, an outer box surrounding the inner box, and a first vibration prevention mechanism that is disposed between the inner box and the outer box, and is configured to prevent the inner box from vibrating due to the vibration of the outer box.

8 Claims, 4 Drawing Sheets

(56) References Cited

U.S. PATENT DOCUMENTS

2021/0189318 A1    6/2021  Aoki et al.

FOREIGN PATENT DOCUMENTS

| JP | 2017-201886 A | 11/2017 |
| JP | 2018-183062 A | 11/2018 |
| JP | 2019-076031 A | 5/2019 |
| JP | 2019-208428 A | 12/2019 |
| WO | 2020/049968 A1 | 3/2020 |

OTHER PUBLICATIONS

International Search Report dated May 25, 2021 issued in International Patent Application No. PCT/JP2021/009451, with English translation.

* cited by examiner

CULTURE DEVICE WITH A VIBRATION PREVENTION MECHANISM

CROSS-REFERENCE OF RELATED APPLICATIONS

This application is a Continuation of International Patent Application No. PCT/JP2021/009451, filed on Mar. 10, 2021, which in turn claims the benefit of Japanese Patent Application No. 2020-050848, filed on Mar. 23, 2020, the entire disclosures of which Applications are incorporated by reference herein.

TECHNICAL FIELD

The present invention relates to a culture apparatus.

BACKGROUND ART

In recent years, regenerative medicine and individualized medicine become widespread. In the future, as regenerative medicine and the like become more widespread, the transport of cells and organs would become common. In dealing with this situation, it is considered to be more cost-effective to construct a cell factory and perform cell culture in bulk at the cell factory rather than performing cell culture at each medical institution. For transporting cultures such as cells from a cell factory to a medical institution, transporting the cultures in a frozen or low-temperature state is possible; however such transportation would require increased procedures due to the work relating to freezing the cultures and keeping them at a low temperature. In order to solve such a problem, for example, it is possible to transport the cultures by using a culture apparatus (incubator) as described in Patent Literature (hereinafter, referred to as PTL) 1 while culturing the cultures.

CITATION LIST

Patent Literature

PTL 1

Japanese Patent Application Laid-Open No. 2017-201886

SUMMARY OF INVENTION

Technical Problem

When cultures are transported by using a culture apparatus as described in PTL 1, bubbles and waves may be generated in the medium due to the shaking during the transport, which may damage the culture. For eliminating such damage, the culture apparatus may be transported with a dedicated transport means, which unfortunately may lead to an increased cost.

An object of the present invention is to provide a culture apparatus that can transport a culture without damaging the culture and without causing cost increase.

Solution to Problem

For achieving the object, a culture apparatus of the present invention includes an inner box for housing a culture, an outer box surrounding the inner box, and a first vibration prevention mechanism that is disposed between the inner box and the outer box, and is configured to prevent the inner box from vibrating due to the vibration of the outer box.

Advantageous Effects of Invention

A culture apparatus of the present invention can transport a culture without damaging the culture and without causing cost increase.

DESCRIPTION OF EMBODIMENTS

Embodiment

Hereinafter, a culture apparatus according to an embodiment of the present invention will be described with reference to the accompanying drawings. The embodiments described below are merely examples, and do not exclude the application of various modifications and techniques not specified in the following embodiments. In addition, the configurations of the embodiments can be variously modified and implemented without departing from the spirit thereof. Further, the configurations of the embodiments can be selected as necessary, or can be appropriately combined.

In the following description, in a culture apparatus during the usage of the apparatus, the side facing the user (the side where below-described outer door 3a and inner door 3b are located) is referred to as "front" and the side opposite to the front is referred to as "rear." In addition, the left and right are determined based on the case where the culture apparatus is viewed from the front to the rear. In all the drawings for explaining the embodiments, the same elements are in principle denoted by the same reference numerals, and the repetitive description thereof may be omitted.

1. Schematic Configuration of Culture Apparatus

Figure 1:
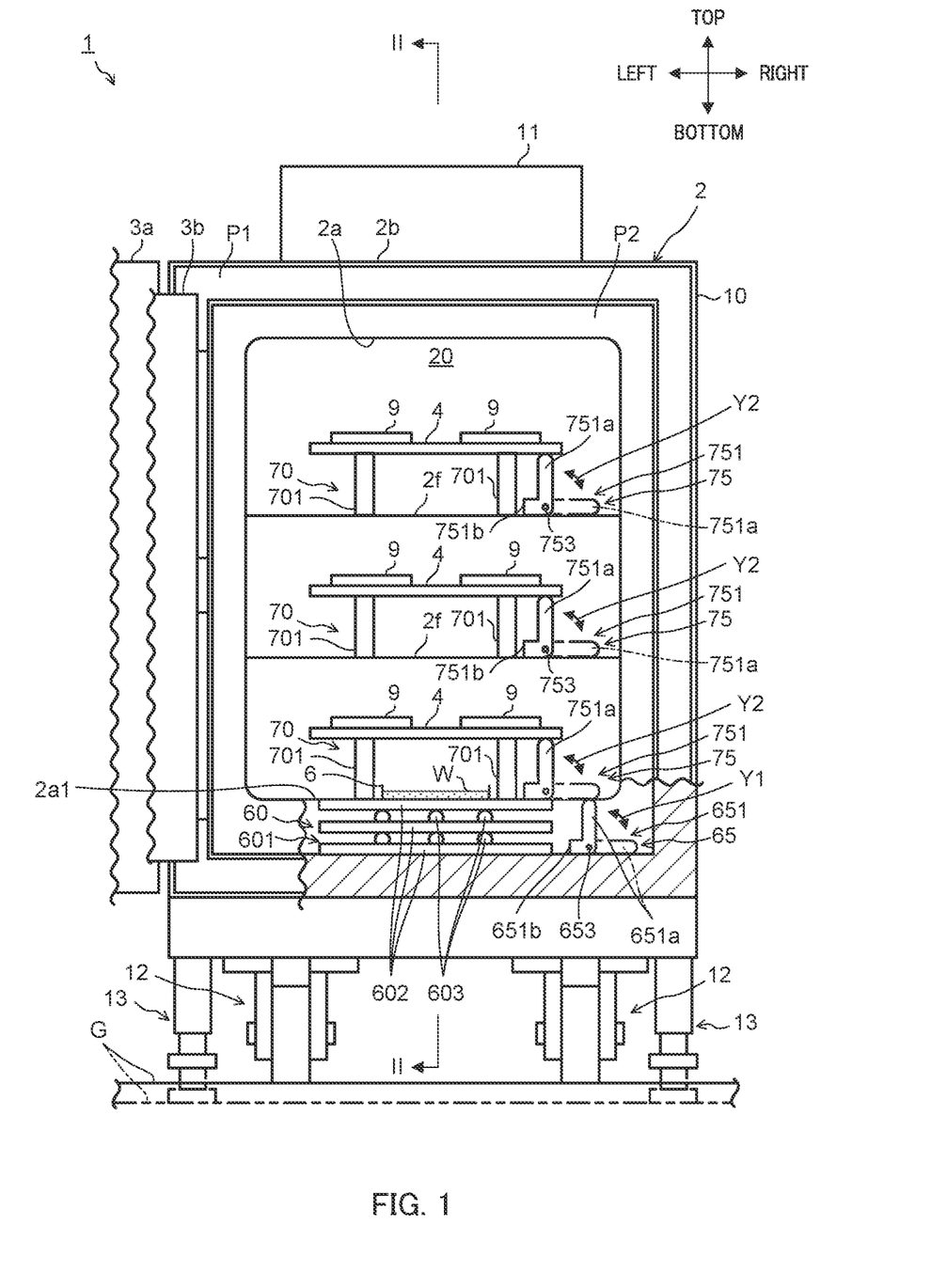
FIG. 1 is a schematic partial cross-sectional view illustrating a culture apparatus of an embodiment of the present invention viewed from the front.
Figure 2:
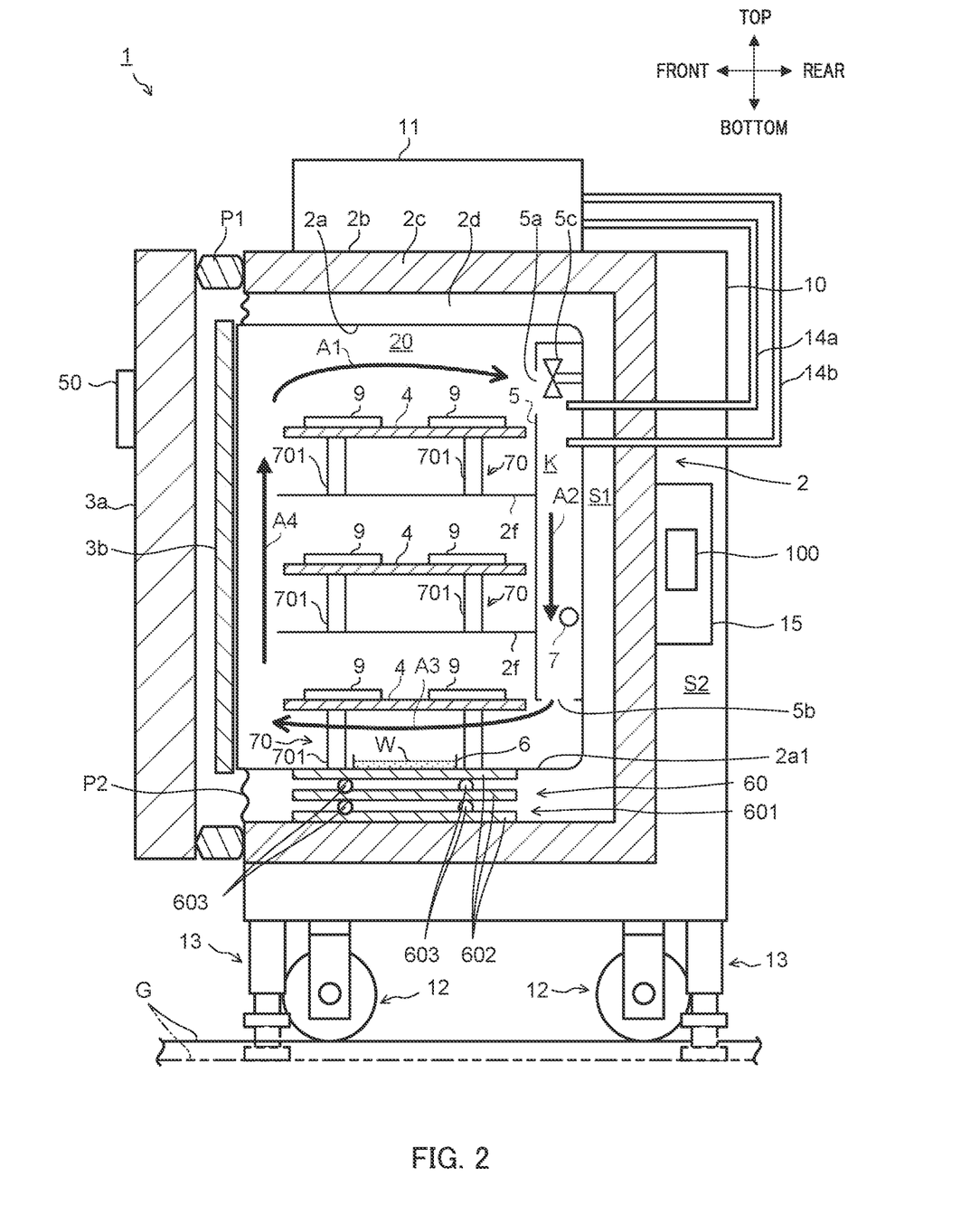
FIG. 2 is a longitudinal cross-sectional view taken along the line II-II of FIG. 1.

In the following, the schematic configuration of a culture apparatus of the present invention will be described. FIG. 1 is a schematic partial cross-sectional view illustrating a culture apparatus of an embodiment of the present invention viewed from the front. FIG. 2 is a longitudinal cross-sectional view taken along the line II-II of FIG. 1.

Culture apparatus 1 illustrated in FIGS. 1 and 2 is used for incubating cultures such as cells, organs, and microorganisms. Culture apparatus 1 includes substantially box-shaped main body 10. Storage box 11 is provided on the upper surface of main body 10. Storage box 11 houses a power source for operating culture apparatus 1, an $O_2$ (oxygen) gas cylinder, a $CO_2$ (carbon dioxide) gas cylinder, and the like. A plurality of (four in the present embodiment) casters 12 for moving culture apparatus 1 are provided on the undersurface of main body 10. A plurality of (four in the present embodiment) adjusters 13 for fixing main body 10 to installation surface G are provided on the undersurface of main body 10. Adjuster 13 is configured to be telescopic (i.e., capable of extending and retracting). When adjusters 13 retract and are not in contact with installation surface G as indicated by the solid line in FIGS. 1 and 2, casters 12 come into contact with installation surface G, allowing the user to move culture apparatus 1 by pushing the apparatus. When adjusters 13 extend and are in contact with installation surface G as indicated by the two-dot chain line in FIGS. 1 and 2, casters 12 are not in contact with installation surface G, allowing culture apparatus 1 to be fixed to installation surface G. Substantially box-shaped heat insulation box 2 is provided inside main body 10.

Heat insulation box 2 includes the following: substantially box-shaped inner box 2a with culture space 20 formed therein; substantially box-shaped outer box 2b surrounding inner box 2a; inner door 3b configured to open and close inner box 2a; and outer door 3a configured to open and close outer box 2b.

Culture space 20 is divided in its vertical direction by a plurality of (three in the present embodiment) shelves 4. Culture space 20 is provided with vibration control mechanisms 70 whose number is the same as that of shelves 4 (three in the present embodiment). Vibration control mechanism 70 prevents shelf 4 from vibrating due to (i.e., that may be caused by) the vibration of inner box 2a. Vibration control mechanism 70 is an exemplary second vibration prevention mechanism. Vibration control mechanism 70 includes a plurality of (four in the present embodiment) vibration control members 701 that support shelf 4 from below at a plurality of locations (four locations in the present embodiment). Examples of vibration control member 701 include members made of rubber, oil dampers, and air dampers. Vibration control members 701 for supporting bottom shelf 4 among three shelves 4 are provided so as to extend upward from the respective four locations on bottom wall 2a1 of inner box 2a. Vibration control members 701 for supporting each of center shelf 4 and top shelf 4 are provided so as to extend upward from the respective four locations on support member 2f fixed to inner box 2a. With the use of vibration control members 701 provided as described above, vibration control mechanism 70 prevents vertical shaking of shelves 4 due to the vibration of inner box 2a.

Culture space 20 is provided with second state switching part (herein also referred to as "state switcher") 75 configured to allow vibration control mechanism 70 to switch between states. In one of the states, vibration control mechanism 70 allows the fixing of shelf 4 to inner box 2a. In the other state, the fixing of shelf 4 to inner box 2a is released so that vibration control mechanism 70 prevents shelf 4 from vibrating due to the vibration of inner box 2a. Second state switcher 75 includes second switching member 751 and second switching drive part (herein also referred to as "switching driver") 752 (see FIG. 3). Second switching member 751 includes second contact part 751a extending in the vertical direction and second rotation restricting part 751b extending in the horizontal direction from the lower end of second contact part 751a. Second switching driver 752 rotates second switching member 751 in the two directions indicated by arrows Y2 about second rotation shaft 753 extending in the front-rear direction of culture apparatus 1.

Duct 5 extending vertically is disposed in culture space 20 at the back surface of inner box 2a. Gas passage K is formed inside duct 5. Circulation blower 5c is disposed in gas passage K. By operating circulation blower 5c, air in culture space 20 is sucked through suction port 5a formed in the upper portion of duct 5, and the air is blown out through blow-out port 5b formed in the lower portion of duct 5 into culture space 20. Forced circulation of the air as indicated by arrows A1, A2, A3, and A4 is thus performed.

Ultraviolet lamp 7 is provided in duct 5. Ultraviolet lamp 7 sterilizes air circulating in culture space 20. In addition, gas supply pipes 14a and 14b for supplying, to culture space 20, adjusting gases ($O_2$ gas and $CO_2$ gas) for adjusting the concentrations of $O_2$ gas and $CO_2$ gas in culture space 20 are installed in duct 5. Gas supply pipes 14a and 14b are connected to the $O_2$ gas cylinder and the $CO_2$ gas cylinder housed in storage box 11, respectively. Gas supply pipes 14a and 14b are provided with an $O_2$ control valve Vo (see FIG. 3) and a $CO_2$ control valve Vc (see FIG. 3), respectively.

Humidification tray 6 configured to store water W for humidifying (hereinafter referred to as "humidification water W") is installed between the lower portion of duct 5 and bottom wall 2a1 of inner box 2a. Humidification tray 6 is heated by humidity control heater H2 having a linear shape (see FIG. 3) provided at the undersurface of bottom wall 2a1 of inner box 2a. The heat from humidity control heater H2 evaporates humidification water W to humidify culture space 20.

Temperature control heater H1 (see FIG. 3) for temperature control, that is, for controlling the temperature of culture space 20 is installed at each of the back surfaces (the surfaces on the outer box 2b side) of the right side wall, the left side wall, the rear wall, the top wall, and the bottom wall of inner box 2a. Temperature control heater H1 is normally energized and generates heat while culture apparatus 1 is in operation.

Heat insulation material 2c is provided in outer box 2b on the inner surface side. Between the inner surface of heat insulation material 2c of outer box 2b and the outer surface of inner box 2a, space S1 is provided so as to cover the top, bottom, left, right, and rear of inner box 2a. There is an opening at the front of space S1. The opening is sealed by sealing member P2. Sealing member P2 is flexible and configured to allow inner box 2a to shift with respect to outer box 2b while sealing of space S1 is maintained. Filling space S1 with air forms an air layer (also referred to as air jacket) 2d in space S1.

Between inner box 2a and outer box 2B, namely in space S1, seismic isolation mechanism 60 is provided to prevent inner box 2a from vibrating due to (i.e., that may be caused by) the vibration of outer box 2b. Seismic isolation mechanism 60 is an exemplary first vibration prevention mechanism. Seismic isolation mechanism 60 includes seismic isolation slider 601. Seismic isolation slider 601 includes plurality of (three in the present embodiment) plate-shaped members 602 and plurality of spheres 603. One plate-shaped member 602 is fixed to outer box 2b at the surface facing bottom wall 2a1 of inner box 2a. One of other plate-shaped members 602 is fixed to the undersurface of bottom wall 2a1 of inner box 2a. The last plate-shaped member is disposed between two plate-shaped members 602. Plurality of (three in the present embodiment) spheres 603 are rotatably disposed between plate-shaped members 602 facing each other. In seismic isolation slider 601, spheres 603 rotate to relatively move upper plate-shaped member 602 with respect to lower plate-shaped member 602 (the upper and lower plate-shaped members are two of plate-shaped members 602 facing each other). Seismic isolation slider 601 thus prevents horizontal shaking of inner box 2a due to the vibration of outer box 2b.

Space S1 is provided with first state switcher 65 configured to allow seismic isolation mechanism 60 to switch between states. In one of the states, seismic isolation mechanism 60 allows the fixing of inner box 2a to outer box 2b. In the other state, the fixing of inner box 2a to outer box 2b is released so that seismic isolation mechanism 60 prevents inner box 2a from vibrating due to the vibration of outer box 2b. First state switcher 65 includes first switching member 651 and first switching driver 652 (see FIG. 3). First switching member 651 includes first contact part 651a and first rotation restricting part 651b. First contact part 651a and first rotation restricting part 651b are configured in the same manner as second contact part 751a and second rotation restricting part 751b of second switching member 751 of second state switcher 75. First switching driver 652 rotates first switching member 651 in the two directions indicated by arrows Y1 about first rotation shaft 653 extending in the front-rear direction of culture apparatus 1.

Outer door 3a is provided with packing P1 at the outer edge thereof. Outer door 3a is provided with operation device 50 to be operated by a user. Operation device 50 includes a liquid crystal display device with a touch panel. Operation device 50 functions as a display that displays various information and buttons on a display screen. Operation device 50 also functions as an operation part for receiving setting input from a button displayed on the display screen. Operation device 50 is configured to receive instructions for starting and stopping culture apparatus 1 and the input of various set values for culture space 20. Examples of the set values for culture space 20 include a set temperature, a set humidity, a set concentration of $O_2$ gas, and a set concentration of $CO_2$ gas. At least one of outer door 3a and main body 10 is provided with door switch Sd (see FIG. 3) for detecting the opened and closed states (and/or opening and closing, also referred to as opening/closing) of outer door 3a. Door switch Sd is an exemplary opening/closing detector.

The space between main body 10 and the back and bottom surfaces of outer box 2b of heat insulation box 2 forms machine room S2 in which various devices are to be disposed. Electrical box 15 is provided in machine room S2 on the side of the back surface of outer box 2b. Control device 100 and other electrical components (not illustrated) are housed in electrical box 15. Control device 100 controls the temperature, humidity, $O_2$ concentration, and $CO_2$ concentration in culture space 20 based on the operation received by operation device 50.

2. Control Configuration

Figure 3:
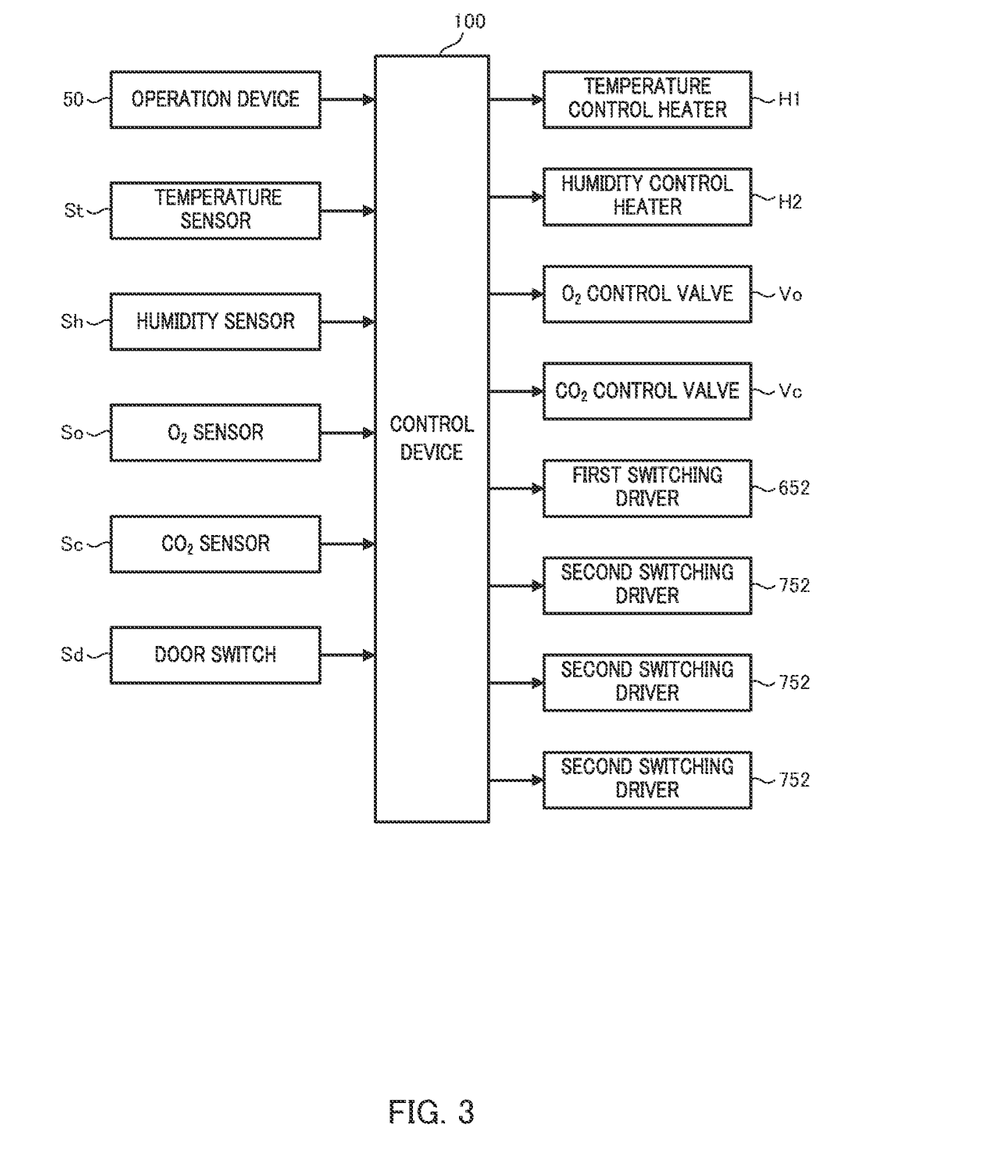
FIG. 3 is a schematic functional block diagram illustrating a principal part of a control configuration of the culture apparatus.

Hereinafter, a principal part of a control configuration of culture apparatus 1 according to an embodiment of the present invention will be described with reference to FIG. 3. FIG. 3 is a schematic functional block diagram illustrating the principal part of the control configuration of culture apparatus 1.

As illustrated in FIG. 3, control signals are input from operation device 50, temperature sensor St, humidity sensor Sh, $O_2$ sensor So, $CO_2$ sensor Sc, and door switch Sd to control device 100. Control device 100 is an exemplary controller. In addition, control device 100 outputs control commands to temperature control heater H1, humidity control heater H2, $O_2$ control valve Vo, $CO_2$ control valve Vc, first switching driver 652, and second switching driver 752.

Operating device 50 is configured to receive various inputs. Specifically, operation device 50 receives an operation for starting culture apparatus 1 (turn the apparatus on), an operation for stopping culture apparatus 1 (turn the apparatus off), and operations for inputting various settings such as set temperature T, set humidity H, set $O_2$ concentration x [%], and set $CO_2$ concentration y [%] in culture space 20. Operation device 50 inputs these inputs as control signals to control device 100.

Temperature sensor St detects the temperature in culture space 20, and outputs the detected temperature as a control signal to control device 100.

Humidity sensor Sh detects the humidity in culture space 20, and outputs the detected humidity as a control signal to control device 100.

$O_2$ sensor So detects the $O_2$ concentration in culture space 20, and outputs the detected $O_2$ concentration as a control signal to control device 100.

$CO_2$ sensor Sc detects the $CO_2$ concentration in culture space 20, and outputs the detected $CO_2$ concentration as a control signal to control device 100.

Door switch Sd may output a closing signal when outer door 3a is in a closed state and output an opening signal when outer door 3a is in an opened state. Alternatively, door switch Sd may output a signal only when outer door 3a is in either the closed state or the opened state.

Control device 100 controls the output of temperature control heater H1 based on the temperature in culture space 20 detected by temperature sensor St (hereinafter referred to as "detected temperature value"). Specifically, the rate of energization to temperature control heater H1 is controlled in such a way that when the detected temperature value is lower than set temperature T by a predetermined value or more, the heating power of temperature control heater H1 is increased, and when the detected temperature value is higher than set temperature T by a predetermined value or more, the heating power of temperature control heater H1 is lowered.

Control device 100 controls the output of humidity control heater H2 based on the humidity in culture space 20 detected by the humidity sensor Sh (hereinafter referred to as "detected humidity value") in such a way that the detected humidity value becomes substantially the same as set humidity H. Specifically, the rate of energization to humidity control heater H2 is controlled in such a way that when the detected humidity value is lower than set humidity H by a predetermined value or more, the humidifying power of humidity control heater H2 is increased, and when the detected humidity value is higher than set humidity H by a predetermined value or more, the humidifying power of humidity control heater H2 is lowered.

Control device 100 controls $O_2$ control valve Vo and $CO_2$ control valve Vc based on the $O_2$ concentration in culture space 20 detected by $O_2$ sensor So (hereinafter referred to as "detected $O_2$ concentration value") and the $CO_2$ concentration in culture space 20 detected by $CO_2$ sensor Sc (hereinafter referred to as "detected $CO_2$ concentration value") in such a way that the detected $O_2$ concentration value becomes substantially the same as set $O_2$ concentration x and the detected $CO_2$ concentration value becomes substantially the same as set $CO_2$ concentration y.

When door switch Sd detects a closed state of outer door 3a, control device 100 controls first switching driver 652 and second switching driver 752 in such a way that first switching member 651 and second switching member 751 take the postures indicated by the two-dot chain lines in FIG. 1. When door switch Sd detects an opened state of outer door 3a, control device 100 controls first switching driver 652 and second switching driver 752 in such a way that first switching member 651 and second switching member 751 take the postures indicated by the solid lines in FIG. 1.

3. Operation of Culture Apparatus

In the following, the operation of culture apparatus 1 will be described.

For incubating a culture in culture apparatus 1, the user operates operation device 50 to start culture apparatus 1 (turn the apparatus on) while culture apparatus 1 is fixed to installation surface G as indicated by the two-dot chain line in FIGS. 1 and 2. In a state where outer door 3a and inner door 3b are closed, first switching member 651 and second switching member 751 are in the postures indicated by the two-dot chain lines in FIG. 1. In this state, the upper end of first contact part 651a of first switching member 651 is not in contact with the undersurface of inner box 2a, and inner box 2a is supported only by seismic isolation mechanism 60. Therefore, the vibration of outer box 2b is absorbed by seismic isolation mechanism 60, allowing seismic isolation mechanism 60 to prevent the vibration of inner box 2a. In the following, the state in which first switching member 651 is in the posture indicated by the two-dot chain line in FIG. 1 may be referred to as a "first vibration preventing state." In addition, the upper end of second contact part 751a of second switching member 751 is not in contact with the undersurface of shelf 4, and shelf 4 is supported only by vibration control member 701. Therefore, the vibration of inner box 2a is absorbed by vibration control member 701, allowing vibration control mechanism 70 to prevent the vibration of shelf 4. In the following, the state in which second switching member 751 is in the posture indicated by the two-dot chain line in FIG. 1 may be referred to as a "second vibration preventing state." When seismic isolation mechanism 60 is in the first vibration preventing state and vibration control mechanism 70 is in the second vibration preventing state, control device 100 displays the fact on operation device 50. For example, control device 100 causes operation device 50 to display a phrase such as "Vibration prevention mechanism ON."

After confirming that culture apparatus 1 has started, the user opens outer door 3a and inner box 2a. When door switch Sd detects the opening of outer door 3a, control device 100 controls first switching driver 652 and second switching driver 752 to rotate first switching member 651 and second switching member 751 in such a way that the members take the postures indicated by the solid lines in FIG. 1.

In the state indicated by the solid line in FIG. 1, the upper end of first contact part 651a of first switching member 651 is in contact with the undersurface of inner box 2a, and inner box 2a is fixed to outer box 2b via first switching member 651. In the following, the state in which first switching member 651 is in the posture indicated by the solid line in FIG. 1 may be referred to as a "first fixing state." In addition, the upper end of second contact part 751a of second switching member 751 is in contact with the undersurface of shelf 4, and shelf 4 is fixed to inner box 2a via second switching member 751. In the following, the state in which second switching member 751 is in the posture indicated by the solid line in FIG. 1 may be referred to as a "second fixing state." Bringing seismic isolation mechanism 60 into the first fixing state and vibration control mechanism 70 into the second fixing state allows a user to easily put petri dishes 9 on shelves 4. In the state indicated by the solid line in FIG. 1, first switching member 651 transmits the vibration of outer box 2b to inner box 2a, and second switching member 751 transmits the vibration of inner box 2a to shelf 4. Therefore, seismic isolation mechanism 60 does not prevent the vibration of inner box 2a, and vibration control mechanism 70 does not prevent the vibration of the shelf 4. Control device 100 causes operation device 50 to display that the apparatus is in a state such that vibration is not prevented. For example, control device 100 causes operation device 50 to display a phrase such as "Vibration prevention mechanism OFF."

After putting petri dishes 9 containing the culture on shelf 4, the user closes inner door 3b and outer door 3a. When door switch Sd detects the closing of outer door 3a, control device 100 allows seismic isolation mechanism 60 to switch to the first vibration preventing state and vibration control mechanism 70 to the second vibration preventing state. At the same time, control device 100 causes operation device 50 to display, for example, a phrase such as "Vibration prevention mechanism ON." When a user inputs set temperature T, set humidity H, set $O_2$ concentration x, and/or set $CO_2$ concentration y, control device 100 controls temperature control heater H1, humidity control heater H2, $O_2$ control valve Vo, and/or $CO_2$ control valve Vc to adjust the atmosphere in culture space 20 to have a state according to the setting inputs, based on the detection results from temperature sensor St, humidity sensor Sh, $O_2$ sensor So, and/or $CO_2$ sensor Sc.

After closing outer door 3a, the user shortens adjusters 13 as indicated by the solid lines in FIGS. 1 and 2 to, allowing culture apparatus 1 to become movable. The user pushes culture apparatus 1 to rotate the wheels of casters 12, thereby transporting culture apparatus 1 to the destination. As necessary, the user loads culture apparatus 1 in a vehicle, extends adjusters 13 to fix culture apparatus 1 to the vehicle, and then transports culture apparatus 1 to the destination. During the transportation, seismic isolation mechanism 60 prevents inner box 2a from vibrating, and vibration control mechanisms 70 prevent shelves 4 from vibrating. The generation of bubbles and waves in the medium during transportation of culture apparatus 1 thus can be reduced.

After culture apparatus 1 is transported to the destination, the user extends adjusters 13 to fix culture apparatus 1 to installation surface G, and then opens outer door 3a and inner box 2a of culture apparatus 1. Even after culture apparatus 1 is transported to the destination, control device 100 does not end the control of temperature control heater H1, humidity control heater H2, $O_2$ control valve Vo, or $CO_2$ control valve Vc unless the culture apparatus or each function is turned off. When outer door 3a is opened, control device 100 allows seismic isolation mechanism 60 to switch to the first fixing state and vibration control mechanism 70 to the second fixing state. At the same time, control device 100 causes operation device 50 to display a phrase such as "Vibration prevention mechanism OFF." At this time, inner box 2a is fixed to outer box 2b, and shelves 4 are fixed to inner box 2a, and thus the user can easily remove petri dishes 9 from shelves 4.

After removing petri dishes 9 from shelves 4, the user closes inner door 3b and outer door 3a. When outer door 3a is closed, control device 100 allows seismic isolation mechanism 60 to switch to the first vibration preventing state and vibration control mechanism 70 to the second vibration preventing state. At the same time, control device 100 causes operation device 50 to display a phrase such as "Vibration prevention mechanism ON." The user operates operation device 50 to stop culture apparatus 1 (turn the apparatus off).

4. Working Effect of Embodiment

Culture apparatus 1 is provided with seismic isolation mechanism 60 for preventing inner box 2a from vibrating due to the vibration of outer box 2b. This configuration can reduce the generation of bubbles and waves in the medium during transportation of cultures by using culture apparatus 1. In addition, it is possible to reduce the generation of bubbles and waves in the medium during transportation even when a dedicated transportation means is not used. Therefore, culture apparatus 1 capable of transporting a culture without damaging the culture and without causing cost increase can be provided.

Culture apparatus 1 is provided with first state switcher 65 that allows seismic isolation mechanism 60 to switch between the first fixing state and the first vibration preventing state. This configuration allows an easy putting or removing work for a user in culture apparatus 1 when putting petri dishes 9 on shelves 4 or removing petri dishes 9 from shelves 4 by allowing seismic isolation mechanism 60 to switch to the first fixing state.

When door switch Sd detects that outer door 3a is opened, control device 100 allows seismic isolation mechanism 60 to switch from the first vibration preventing state to the first fixing state. This configuration allows a user to easily perform the putting or removing work of petri dishes 9 without performing an operation only for switching the state of seismic isolation mechanism 60.

When seismic isolation mechanism 60 switches from the first vibration preventing state to the first fixing state, control device 100 causes operation device 50 to display a phrase such as "Vibration prevention mechanism OFF." This configuration allows control device 100 to notify the user that outer door 3a is open, thereby preventing the user from forgetting to close the outer door 3a.

Culture apparatus 1 is provided with sealing member P2 surrounding the opening of inner box 2a and extending between inner box 2a and outer box 2b. Sealing member P2 seals space S1 between inner box 2a and outer box 2b. This configuration can reduce the temperature change in culture space 20 by forming air layer 2d in sealed space S1.

Culture apparatus 1 is provided with vibration control mechanism 70 for preventing shelf 4 from vibrating due to the vibration of inner box 2a. This configuration can further reduce the generation of bubbles and waves in the medium during transportation of cultures by using culture apparatus 1.

Culture apparatus 1 is provided with second state switcher 75 that allows vibration control mechanism 70 to switch between the second fixing state and the second vibration preventing state. This configuration allows an easy putting or removing work for a user when putting petri dishes 9 on shelves 4 or removing petri dishes 9 from shelves 4.

Modifications of Embodiment

The present invention is not limited to those shown in the embodiments described above, and various modifications can be added without departing from the spirit of the present invention.

For example, the posture of first switching member 651 in first state switcher 65 may be manually changed by a user (hereinafter referred to as "first modification"). In this case, first switching driver 652 is not needed. In place of first switching member 651, a member telescopic in the vertical direction may be provided, and the extending and retracting of the member may be used to switch between the first fixing state and the first vibration preventing state (hereinafter referred to as "second modification"). In place of first switching member 651, a member movable in and out in the horizontal direction between inner box 2a and outer box 2b may be provided. Moving the member in and out may be used to switch between the first fixing state and the first vibration preventing state (hereinafter referred to as "third modification"). The above-described first to third modifications may also be applied to second state switcher 75. It is possible not to provide at least one of first state switcher 65 and second state switcher 75 in culture apparatus 1.

As seismic isolation mechanism 60, a seismic isolation rubber, an air damper, or an oil damper may be applied in place of seismic isolation slider 601.

As the first vibration prevention mechanism for preventing inner box 2a from vibrating due to the vibration of outer box 2b, a seismic isolation mechanism or a vibration control mechanism each for preventing vertical shaking may be provided, or a vibration control mechanism for preventing vertical shaking may be provided.

In culture apparatus 1, it is possible not to provide vibration control mechanism 70 for preventing shelf 4 from vibrating due to the vibration of inner box 2a. As the second vibration prevention mechanism for preventing shelf 4 from vibrating due to the vibration of inner box 2a, a seismic isolation mechanism or a vibration control mechanism each for preventing horizontal shaking may be provided, or a seismic isolation mechanism for preventing horizontal shaking may be provided.

Door switch Sd may detect the opening/closing of each of outer door 3a and inner door 3b, or may detect the opening/closing of only inner door 3b. The following configuration is also possible: at least one of temperature sensor St, humidity sensor Sh, $O_2$ sensor So, and $CO_2$ sensor Sc functions as an opening/closing detector; and when the difference between the detection value from the at least one sensor and the set value is equal to or more than a threshold value, control device 100 determines that outer door 3a is opened, and when the difference is less than the threshold value, control device 100 determines that outer door 3a is closed.

Culture apparatus 1 may be transported by a trolley, not providing casters 12 at culture apparatus 1. Culture apparatus 1 may be fixed to installation surface G by using members such as wheel chocks, not providing adjusters 13 at culture apparatus 1.

Figure 4A:
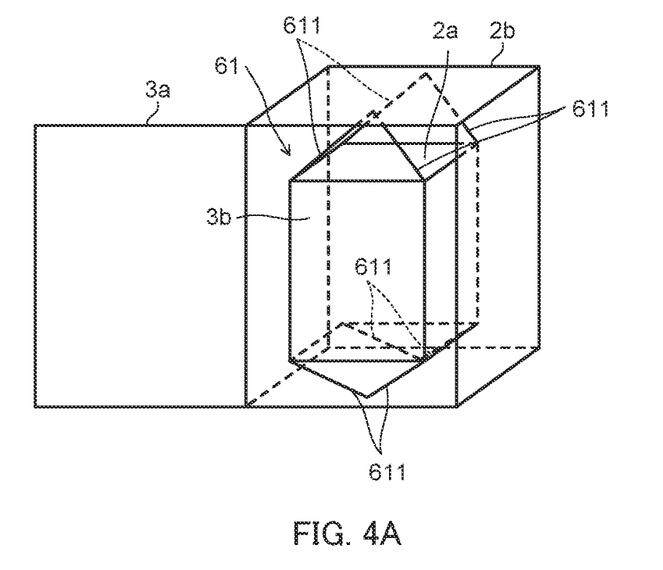
FIG. 4A schematically illustrates a first vibration prevention mechanism of a modification of the present invention.

The following configuration as illustrated in FIG. 4A is also possible: eight vibration control members 611 provided between inner box 2a and outer box 2b function as first vibration prevention mechanism 61, and thus eight vibration control members 611 prevent inner box 2a from vibrating due to the vibration of outer box 2b. In this case, the following configuration is possible: four of eight vibration control members 611 connect the four corners of the upper surface of the top wall of inner box 2a with the undersurface of the top wall of outer box 2b at two locations, and the other four vibration control members 611 connect the four corners of the undersurface of the bottom wall of inner box 2a with the top surface of the bottom wall of outer box 2b at two locations. Examples of vibration control member 611 include members made of rubber, oil dampers, and air dampers.

Figure 4B:
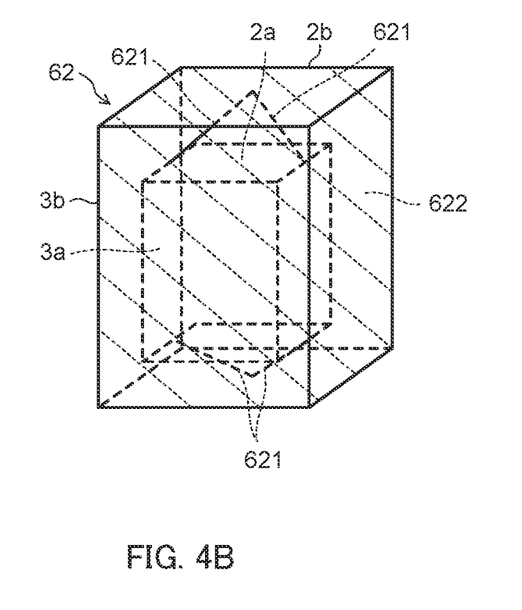
FIG. 4B schematically illustrates a first vibration prevention mechanism of another modification of the present invention.

The following configuration as illustrated in FIG. 4B is also possible: four vibration control members 621 provided between inner box 2a and outer box 2b and a damper of liquid 622 filling the space between inner box 2a and outer box 2b function as first vibration prevention mechanism 62, and thus four vibration control members 621 and the damper of liquid 622 prevent inner box 2a from vibrating due to the vibration of outer box 2b. In this case, the following configuration is possible: two of four vibration control members 621 connect the upper surface of the top wall of inner box 2a (at two locations) with the undersurface of the top wall of outer box 2b (at one location), and the other two vibration control members 621 connect the undersurface of the bottom wall of inner box 2a (at two locations) with the upper surface of the bottom wall of outer box 2b (at one location). As liquid 622 to be function as a damper, sterilized water, which is easily available, may be used. In the configuration illustrated in FIG. 4B, following procedure is possible: after draining liquid 622 between inner box 2a and outer box 2b, outer door 3a and inner door 3b are opened for putting cultures into the culture space of inner box 2a, and then inner door 3b and outer door 3a are closed and liquid 622 is allowed to fill the space between inner box 2a and outer box 2b.

This application is entitled to and claims the benefit of Japanese Patent Application No. 2020-050848 filed on Mar. 23, 2020, the disclosure of which including the specification, drawings and abstract is incorporated herein by reference in its entirety.

INDUSTRIAL APPLICABILITY

The present invention is applicable to a culture apparatus.

REFERENCE SIGNS LIST

1 Culture apparatus
2 Heat insulation box
2a Inner box
2a1 Bottom wall
2b Outer box
2c Heat insulation material
2d Air layer (air jacket)
2f Support member
3a Outer door
3b Inner door
4 Shelf
5 Duct
5a Suction port
5b Blow-out port
5c Circulation blower
6 Humidification tray
7 Ultraviolet lamp
9 Petri dish
10 Main body
11 Storage box
12 Caster
13 Adjuster
14a Gas supply pipe
14b Gas supply pipe
15 Electrical box
20 Culture space
50 Operation device
60 Seismic isolation mechanism
61, 62 First vibration prevention mechanism
65 First state switcher
70 Vibration control mechanism
75 Second state switcher
100 Control device
601 Seismic isolation slider
602 Plate-shaped member
603 Sphere
611, 621 Vibration control member
622 Liquid
651 First switching member
651a First contact part
651b First rotation restricting part
652 First switching driver
653 First rotation shaft
701 Vibration control member
751 Second switching member
751a Second contact part
751b Second rotation restricting part
752 Second switching driver
753 Second rotation shaft
G Installation surface
H1 Temperature control heater
H2 Humidity control heater
K Gas passage
P1 Packing
P2 Sealing member
S1 Space
S2 Machine room
Sc $CO_2$ sensor
Sd Door switch
Sh Humidity sensor
So $O_2$ sensor
St Temperature sensor
Vc $CO_2$ control valve
Vo $O_2$ control valve
W Humidification water

The invention claimed is:

1. A culture apparatus, comprising:
an inner box for housing a culture;
an outer box surrounding the inner box; and
a first vibration prevention mechanism disposed between the inner box and the outer box,
wherein the first vibration prevention mechanism is configured to prevent the inner box from vibrating due to vibration of the outer box,
the first vibration prevention mechanism includes a plurality of plates and a plurality of spheres,
the plurality of plates includes a first plate fixed to the inner box and a second plate fixed to the outer box, and the rest of the plurality of plates are disposed between the first plate and the second plate,
the plurality of spheres are rotatably disposed between the plurality of plates,
the plurality of spheres are configured to rotate to move an upper plate of the plurality of plates with respect to a lower plate of the plurality of plates, and
the upper plate and the lower plate are two plates of the plurality of plates directly facing each other.

2. The culture apparatus according to claim 1, further comprising:
a first state switcher configured to allow the first vibration prevention mechanism to switch between states, wherein, in one state of the states, the first vibration prevention mechanism allows fixing of the inner box to the outer box, and in another state of the states, the fixing of the inner box to the outer box is released so that the first vibration prevention mechanism prevents the inner box from vibrating due to the vibration of the outer box.

3. The culture apparatus according to claim 2, further comprising:
- an inner door configured to open and close the inner box;
- an outer door configured to open and close the outer box;
- an opening/closing detector configured to detect an opened or closed state of at least one door of the inner door and the outer door; and
- a controller that controls, when the opening/closing detector detects that the at least one door is opened, the first state switcher to allow the first vibration prevention mechanism to switch from the other state, in which the first vibration prevention mechanism prevents the inner box from vibrating due to the vibration of the outer box, to the one state, in which the first vibration prevention mechanism allows the fixing of the inner box to the outer box.

4. The culture apparatus according to claim 2, wherein
the first state switcher includes a first switching member and a first switching driver,
the first switching member includes a first contact part extending in vertical direction and a first rotation restricting part extending in horizontal direction from a lower end of the first contact part, and
the first switching driver is configured to rotate the first switching member about a first rotation shaft.

5. The culture apparatus according to claim 1, further comprising:
a sealing member surrounding an opening of the inner box and extending between the inner box and the outer box, the sealing member sealing a space between the inner box and the outer box.

6. The culture apparatus according to claim 1, further comprising:
- a shelf disposed inside the inner box; and
- a second vibration prevention mechanism disposed between the inner box and the shelf,
- the second vibration prevention mechanism being configured to prevent the shelf from vibrating due to vibration of the inner box.

7. The culture apparatus according to claim 6, wherein:
the second vibration prevention mechanism is a vibration control mechanism.

8. The culture apparatus according to claim 6, wherein the second vibration prevention mechanism includes a plurality of vibration control members that support the shelf, and the plurality of vibration control members are made of rubber, oil dampers, or air dampers.

* * * * *